US009590543B2

(12) United States Patent
Watanabe et al.

(10) Patent No.: US 9,590,543 B2
(45) Date of Patent: Mar. 7, 2017

(54) SENSORLESS DRIVE DEVICE AND CONTROL METHOD THEREOF

(71) Applicant: MIKUNI CORPORATION, Chiyoda-ku, Tokyo (JP)

(72) Inventors: Kenichi Watanabe, Iwate (JP); Naoki Kobayashi, Iwate (JP); Kazuhiro Fujiwara, Iwate (JP); Takashi Doi, Iwate (JP)

(73) Assignee: MIKUNI CORPORATION, Tokyo (JP)

( * ) Notice: Subject to any disclaimer, the term of this patent is extended or adjusted under 35 U.S.C. 154(b) by 0 days.

(21) Appl. No.: 14/758,337

(22) PCT Filed: Dec. 10, 2013

(86) PCT No.: PCT/JP2013/083059
§ 371 (c)(1),
(2) Date: Jun. 29, 2015

(87) PCT Pub. No.: WO2014/103699
PCT Pub. Date: Jul. 3, 2014

(65) Prior Publication Data
US 2015/0333673 A1 Nov. 19, 2015

(30) Foreign Application Priority Data

Dec. 28, 2012 (JP) ................................ 2012-288946

(51) Int. Cl.
*H02P 6/00* (2016.01)
*H02P 6/20* (2016.01)
(Continued)

(52) U.S. Cl.
CPC .............. *H02P 6/205* (2013.01); *H02P 6/085* (2013.01); *H02P 6/18* (2013.01); *H02P 6/182* (2013.01); *H02P 6/21* (2016.02)

(58) Field of Classification Search
CPC ................................. H02P 6/157; H02P 6/182
(Continued)

(56) References Cited

U.S. PATENT DOCUMENTS 5,663,618 A 9/1997 Adachi et al.
5,731,670 A 3/1998 Galbiati et al.
(Continued)

FOREIGN PATENT DOCUMENTS

JP   H07274584 A   10/1995
JP   09266690 A    10/1997
(Continued)

OTHER PUBLICATIONS

International Search Report corresponding to Application No. PCT/JP2013/083059; Date of Mailing: Mar. 4, 2014.
(Continued)

*Primary Examiner* — Eduardo Colon Santana
*Assistant Examiner* — Bickey Dhakal
(74) *Attorney, Agent, or Firm* — Cantor Colburn LLP

(57) ABSTRACT

The purpose of the present invention is to reduce noise by controlling vibration due to rotation fluctuation, and to consume only current required for maintaining the rotation by bringing the current for driving a motor closer to a state of synchronization. A drive means drives a sensorless brushless DC motor by switching an energization pattern at a constant frequency to determine the rotation position of the rotor of the sensorless brushless DC motor. A detection means detects a zero-cross signal representing the switching of the phase of the rotor. A calculation means calculates a synchronization determination rate representing a percentage of the number of detected zero-cross signals. A pulse width control means controls the pulse width of a PWM drive duty in the drive means so that the calculated synchronization determination rate falls within a target range.

6 Claims, 11 Drawing Sheets

(51) Int. Cl.
*H02P 6/18* (2016.01)
*H02P 6/08* (2016.01)

(58) Field of Classification Search
USPC .................. 318/400.35, 400.34, 459, 85, 705
See application file for complete search history.

(56) References Cited

U.S. PATENT DOCUMENTS

| | | | |
|---|---|---|---|
| 2009/0167220 A1* | 7/2009 | Kanamori | .................. H02P 6/20 |
| | | | 318/400.11 |
| 2010/0127656 A1* | 5/2010 | Ohtani | ..................... H02P 21/06 |
| | | | 318/811 |
| 2012/0306416 A1 | 12/2012 | Hano | |

FOREIGN PATENT DOCUMENTS

| | | | |
|---|---|---|---|
| JP | 2003111482 A | | 4/2003 |
| JP | 2005214216 A | | 8/2005 |
| JP | 2006149122 A | | 6/2006 |
| JP | 2007166769 A | | 6/2007 |
| KR | 20120130479 A | * | 12/2012 |

OTHER PUBLICATIONS

Extended European Search Report correcponding to Application No. 13867804.0-1806/2940856 PCT/JP2013/083059; Dated: Nov. 28, 2016.

* cited by examiner

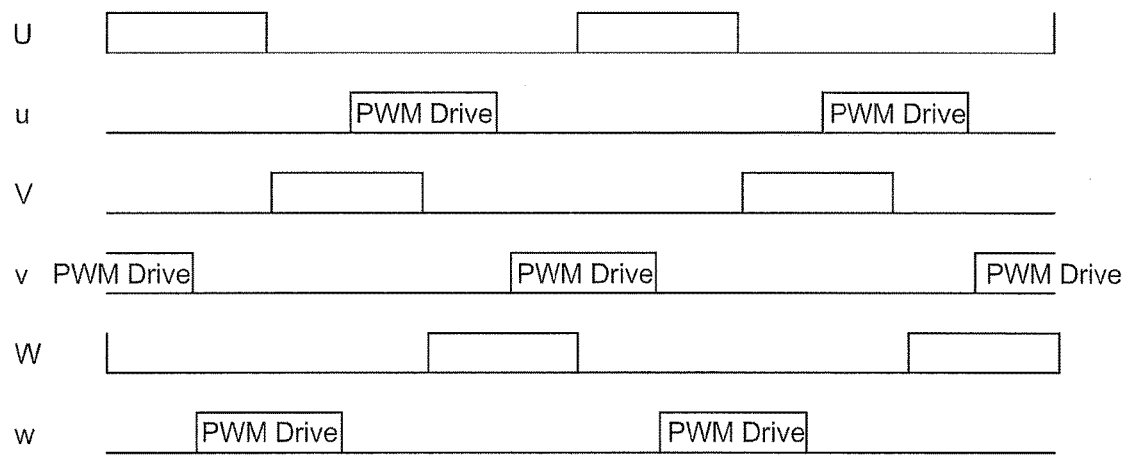
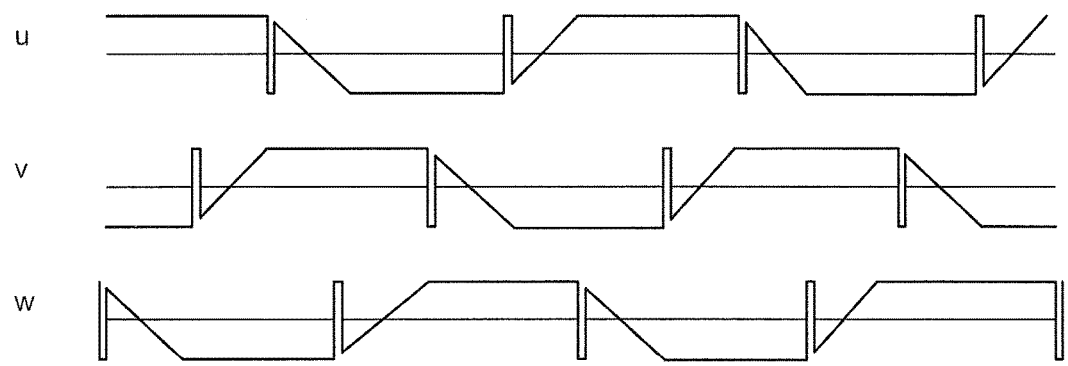
Fig.2

| Mode | Comparison | Duty | Subsequent Mode |
|---|---|---|---|
| Previous Duty Negative | Synchronization Determination Rate < Determination Value H | −1 | Previous Duty Negative |
| | Synchronization Determination Rate < Determination Value LL | −2 | |
| | Synchronization Determination Rate < Determination Value H | 0 | Previous Duty Positive |
| Previous Duty Positive | Synchronization Determination Rate < Determination Value L | +1 | Previous Duty Positive |
| | Synchronization Determination Rate < Determination Value L | 0 | Previous Duty Negative |

Fig.7

| Parameter | Value |
|---|---|
| Determination Value H | 20% |
| Determination Value L | 10% |
| Determination Value LL | 5% |
| Control Start Duty | 20% |
| Control Duty Minimum Value | 5.9% |
| Control Duty Maximum Value | 35% |
| Synchronization Determination Rate Sample Number | 90 (90 samples on every electrical angle of 60 degrees) |
| Synchronization Determination Rate Pause Number | 10 (10 pauses on every electrical angle of 60 degrees) |

Fig.8

SENSORLESS DRIVE DEVICE AND CONTROL METHOD THEREOF

CROSS REFERENCE TO RELATED APPLICATIONS

This is a U.S. national stage of application No. PCT/JP2013/083059, filed on Dec. 10, 2013. Priority under 35 U.S.C. §119(a) and 35 U.S.C. §365(b) is claimed from Japanese Patent Applications No. 2012-288946 filed on Dec. 28, 2012, the disclosure of which is also incorporated herein by reference.

TECHNICAL FIELD

The present invention relates a sensorless drive device, a control method, and a computer program for a brushless DC motor.

BACKGROUND ART

In a sensorless control for driving a brushless DC (Direct Current) motor in a sensorless manner, rotation synchronization control is performed by detecting a zero-cross signal with a neutral point of a back electromotive force (for example, see PTL 1).

During activation in the sensorless control, phase alternation is performed with a constant rate, and a zero-cross signal is detected, so that the brushless DC motor is caused to follow and the brushless DC motor is activated.

When the oil temperature is low in the oil pump motor, the viscosity of oil is high, and therefore, the rotation speed is limited because of reasons such as cavitation. When the rotation speed is low, the back electromotive force is small, and therefore, it is difficult to detect the zero-cross signal.

It has been proposed that the rotation control is performed with a constant rotation rate at a low temperature in accordance with the oil temperature, and when the oil temperature attains a high temperature, or when a certain period of time passes, synchronization is carried out (for example, see PTL 2).

CITATION LIST

Patent Literature (PTL 1) JP 2003-111482 A
(PTL 2) JP 2005-214216 A

SUMMARY OF INVENTION

Technical Problem

However, in a case where the motor is rotated with a constant rate (phase alternation is performed), and the drive torque generated by a drive electric current is more than the braking torque caused by the viscosity of the oil, then, the motor is completely rotated at the initial state of the phase alternation, and thereafter the motor stops until a subsequent phase alternation, and therefore, this generates noise due to variation in the rotation.

In a case where the motor is rotated with a constant rate, and the drive torque generated by a drive electric current is less than the braking torque caused by the viscosity of the oil, the motor slips and rotates later than the phase alternation, and therefore, this generates noise due to variation in the rotation.

In a case where the motor is rotated with a constant rate, and the drive torque generated by a drive electric current is the same as the braking torque caused by the viscosity of the oil, the motor rotates as if in synchronization, and therefore, this does not generate noise due to variation in the rotation, but it is difficult to make synchronization determination since the rotation rate is low.

Therefore, it is an object of the present invention to solve the above problem, and more specifically, it is an object of the present invention to provide a drive device, a control method, and a computer program which can reduce noise by suppressing vibration caused by the variation in the rotation, cause an electric current for rotating the motor to be closer to the electric current that flows when synchronization is attained, and consume only an electric current required for maintaining the rotation.

Solution to Problem

In order to solve the problems, an drive device according to one aspect of the present invention comprises drive means that drives a sensorless brushless DC motor by alternation, with a constant cycle, an energizing pattern for determining a rotation position of a rotor of the sensorless brushless DC motor, detection means that detects a zero-cross signal indicating alternation of a phase of the rotor, calculation means that calculates a synchronization determination rate indicating a ratio of the number of detected zero-cross signals, and PWM (Pulse Width Modulation) drive duty control means that controls a pulse width of a PWM drive duty of the drive means so that the calculated synchronization determination rate is in a target range.

In the drive device according the above aspect of the present invention, adding to the above-mentioned configuration, the PWM drive duty control means is configured to narrow the pulse width of the PWM drive duty, widen the pulse width of the PWM drive duty, or maintain the pulse width of the PWM drive duty, in accordance with a result of a comparison of a first threshold value and the synchronization determination rate, or a comparison of a second threshold value less than the first threshold value and the synchronization determination rate.

Further, in the drive device according the above aspect of the present invention, adding to the above-mentioned configuration, the PWM drive duty control means is configured to, in a case where the synchronization determination rate is less than the first threshold value or equal to or less than the second threshold value in a previous control of the pulse width of the PWM drive duty, narrow the pulse width of the PWM drive duty when the synchronization determination rate is less than the first threshold value in the current control of the pulse width of the PWM drive duty, and maintain the pulse width of the PWM drive duty when the synchronization determination rate is equal to or more than the first threshold value in the current control of the pulse width of the PWM drive duty, and the PWM drive duty control means is further configured to, in a case where the synchronization determination rate is equal to or more than the first threshold value or more than the second threshold value in a previous control of the pulse width of the PWM drive duty, widen the pulse width of the PWM drive duty when the synchronization determination rate is more than the second threshold value in the current control of the pulse width of the PWM drive duty, and maintain the pulse width of the PWM drive duty when the synchronization determination rate is equal to or less than the second threshold value in the current control of the pulse width of the PWM drive duty.

Still further, in the drive device according the above aspect of the present invention, adding to the above-mentioned configuration, the PWM drive duty control means is configured to start the control of the pulse width of the PWM drive duty from the pulse width of the PWM drive duty which is a start width determined in advance.

In the drive device according the above aspect of the present invention, adding to the above-mentioned configuration, the PWM drive duty pulse width control means is configured to start the control of the pulse width of the PWM drive duty from the pulse width of the PWM drive duty which is a start width determined in accordance with an oil temperature.

A control method according to another aspect of the present invention is for a sensorless brushless DC motor driven by alternating, with a constant cycle, an energizing pattern for determining a rotation position of a rotor of the sensorless brushless DC motor, including a detection step for detecting a zero-cross signal indicating alternation of a phase of the rotor of the sensorless brushless DC motor, a calculation step for calculating a synchronization determination rate indicating a ratio of the number of detected zero-cross signals, and a PWM drive duty pulse width control step for controlling a pulse width of a PWM drive duty so that the calculated synchronization determination rate is in a target range.

A computer program according to further aspect of the present invention is to cause a computer that controls a sensorless brushless DC motor driven by alternating, with a constant cycle, an energizing pattern for determining a rotation position of a rotor of the sensorless brushless DC motor, to execute processing including a calculation step for calculating a synchronization determination rate indicating a ratio of the number of detected zero-cross signals indicating alternation of a phase of the rotor of the sensorless brushless DC motor and a PWM drive duty pulse width control step for controlling a pulse width of a PWM drive duty so that the calculated synchronization determination rate is in a target range.

Advantageous Effects of Invention

According to the present invention, a drive device, a control method, and a computer program can be provided, which can reduce noise by suppressing vibration caused by the variation in the rotation, cause an electric current for rotating the motor to be closer to the electric current that flows when synchronization is attained, and consume only an electric current required for maintaining the rotation.

BRIEF DESCRIPTION OF DRAWINGS

FIG. 2 is a figure for explaining a drive method of a brushless DC motor and a back electromotive force of a motor.

FIG. 7 is a figure illustrating an example of a step value of control of a drive duty with respect to a synchronization determination rate.

FIG. 8 is a figure illustrating an example of parameters and values thereof.

DESCRIPTION OF EMBODIMENTS

A cooling system according to an embodiment of the present invention will be explained with reference to FIGS. 1 to 12.

Figure 1:
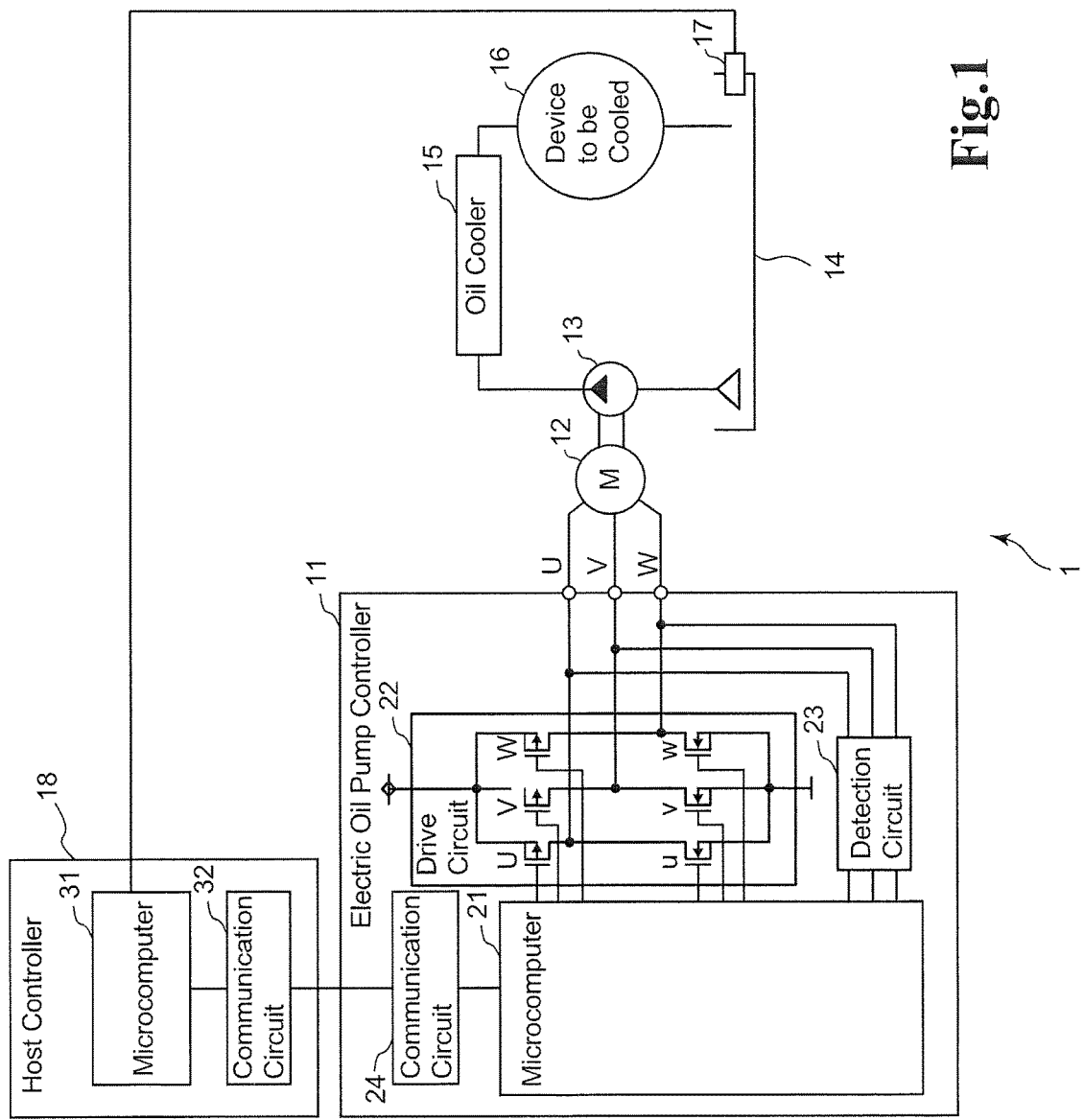
FIG. 1 is a block diagram illustrating an example of a configuration of a cooling system.

FIG. 1 is a block diagram illustrating an example of a configuration of a cooling system. The cooling system 1 circulates cooling oil to cool devices to be cooled such as an electric motor and an electric power generator. The cooling system 1 comprises an electric oil pump controller 11, a motor 12, a pump 13, an oil pan 14, an oil cooler 15, a device to be cooled 16, an oil temperature sensor 17, and a host controller 18.

The electric oil pump controller 11 drives and controls the motor 12 in accordance with a command given by the host controller 18. The motor 12 is a sensorless brushless DC motor, and drives the pump 13. The pump 13 is, for example, a rotary positive displacement pump, and sucks cooling oil accumulated in an oil sump of the oil pan 14 and pneumatically transports the cooling oil to the device to be cooled 16 via the oil cooler 15 in a pressurized manner. The oil cooler 15 dissipates heat of the oil passing therethrough. The device to be cooled 16 is an electric motor, an electric power generator, and the like, and is cooled by oil pneumatically transported from the pump 13. The oil that has cooled the device to be cooled 16 is returned to the oil pan 14.

The oil temperature sensor 17 is provided in the oil pan 14, and detects the temperature of the cooling oil (hereinafter referred to as an oil temperature) accumulated in the oil sump of the oil pan 14, and provides an oil temperature signal indicating the detected temperature to the host controller 18.

The electric oil pump controller 11 comprises a microcomputer 21, a drive circuit 22, a detection circuit 23, and a communication circuit 24. The microcomputer 21 is constituted by a general-purpose microcomputer, a microcomputer dedicated for motor control, or the like, and is configured to execute a control program to perform various kinds of tasks. The microcomputer 21 controls the drive circuit 22 in accordance with a signal given by the detection circuit 23, a command given by the host controller 18 received by the communication circuit 24, and the like.

The drive circuit 22 is an example of drive means, and drives the motor 12 by alternating, with a constant cycle, an energizing pattern for determining the rotation position of a rotor of the motor 12 which is a sensorless brushless DC motor on the basis of control of the microcomputer 21.

The microcomputer 21 controls the rotation rate of the motor by successively alternating the energizing pattern of U, V, W and, u, v, w of the drive circuit 22 in accordance with the energizing pattern in FIG. 2.

Further, the microcomputer 21 controls the drive electric current of the motor by controlling the pulse width of PWM drive duty of u, v, w of the drive circuit 22 on the basis of the control of the microcomputer 21, thus controlling the drive torque of the motor.

The detection circuit 23, which is an example of detection means, comprises a filter, a comparison circuit, a logic circuit, an A/D conversion device, and others for detecting back electromotive force of the motor 12 as shown in FIG. 2, and generating a signal indicating the state of the motor 12 to provide it to the microcomputer 21. The detection circuit 23 detects a zero-cross signal indicating alternation of a phase of the rotor of the motor 12 which is a sensorless brushless DC motor. The communication circuit 24 communicates with the host controller 18 to obtain a command from the host controller 18, and to provide a signal indicating the state of the electric oil pump controller 11 or the motor 12 to the host controller 18.

The host controller 18 comprises a microcomputer 31 and a communication circuit 32. The microcomputer 31 is made of a general-purpose microcomputer, and performs various kinds of processing such as executing a host control program, obtaining an oil temperature signal from the oil temperature sensor 17, and commanding the electric oil pump controller 11. For example, the communication circuit 32 communicates with the electric oil pump controller 11, transmits a command to the electric oil pump controller 11, and obtains a signal indicating the state of the electric oil pump controller 11 or the motor 12 from the electric oil pump controller 11.

The host controller 18 determines whether to stop the motor 12 rotating the pump 13, cause the motor 12 to operate in synchronization, or operate with the control (step optimum value control) on the basis of the state of the device to be cooled 16 and the oil temperature signal from the oil temperature sensor 17, and gives a command to the electric oil pump controller 11 via the communication circuit 32. Further, in some cases, an oil temperature signal is provided via the communication circuit 32 to the electric oil pump controller 11.

Figure 3:
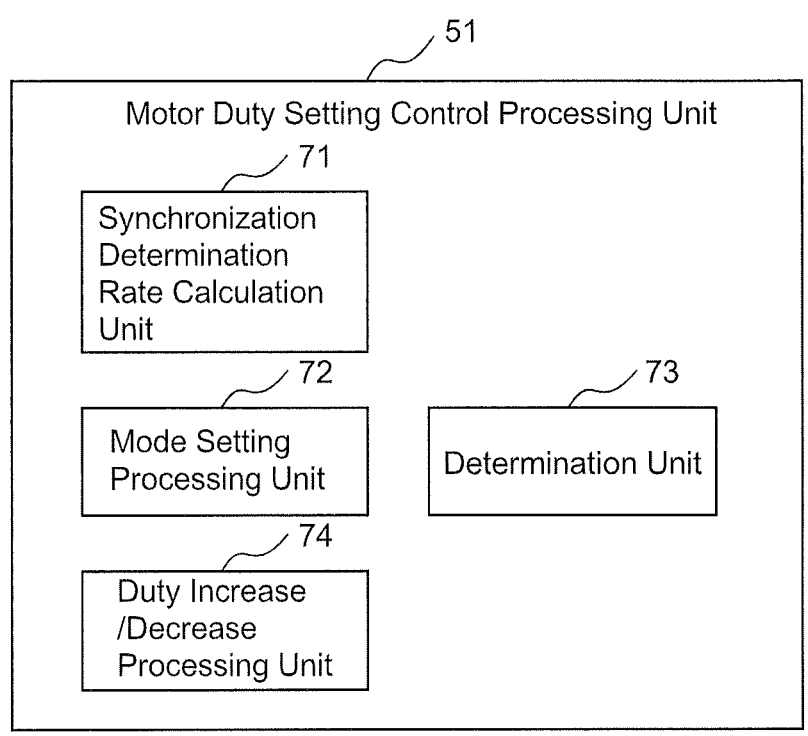
FIG. 3 is a block diagram illustrating a configuration of functions achieved by causing a microcomputer 21 to execute a control program.

FIG. 3 is a block diagram illustrating a configuration of functions achieved by causing the microcomputer 21 to execute the control program. When the microcomputer 21 executes the control program, a motor duty setting control processing unit 51 is achieved.

When synchronization operation is performed, the motor duty setting control processing unit 51 alternates the energizing pattern for driving the motor 12 in synchronization with the zero-cross signal on the basis of the zero-cross signal given by the detection circuit 23, sets the pulse width of the PWM drive duty commanded by the host controller 18 via the communication, and gives a command of the pulse width of the PWM drive duty to the drive circuit 22, thus controlling the driving of the motor 12.

In a case of operation with the control (step optimum value control), the motor duty setting control processing unit 51 alternates the energizing pattern with a constant cycle, and sets the pulse width of the PWM drive duty for driving the motor 12 on the basis of the zero-cross signal given by the detection circuit 23, and gives a command of the pulse width of the PWM drive duty to the drive circuit 22, thus controlling the driving of the motor 12.

The explanation below is in a case of operation with the control.

The motor duty setting control processing unit 51 comprises a synchronization determination rate calculation unit 71, a mode setting processing unit 72, a determination unit 73, and a duty increase/decrease processing unit 74. The synchronization determination rate calculation unit 71, which is an example of calculation means, calculates a synchronization determination rate indicating a ratio of the number of zero-cross signals detected by the detection circuit 23. In a case where the motor 12, i.e., the sensorless brushless DC motor, theoretically outputs a single zero-cross signal on every electrical angle of 60 degrees, for example, the synchronization determination rate calculation unit 71 calculates, as a synchronization determination rate, a percentage obtained by dividing the number of zero-cross signals, given by the detection circuit 23 obtained in sampling where up to 90 zero-cross signals can be obtained, by the maximum number of sampling (90 in this case).

The mode setting processing unit 72 sets the mode of the motor duty setting control processing unit 51 into any one of the modes, i.e., previous duty positive mode, previous duty negative mode, or duty minimum/maximum changing mode, in accordance with the state of the control of the motor duty setting control processing unit 51. The determination unit 73 compares a determination value H, a determination value L, or a determination value LL with the synchronization determination rate, and determines whether the synchronization determination rate is in a target range. The determination value H, the determination value L, and the determination value LL are set in advance. The value of the determination value H is more than the value of the determination value L, and the value of the determination value L is more than the value of the determination value LL. The duty increase/decrease processing unit 74, which is an example of PWM drive duty pulse width control means, controls the pulse width of the PWM drive duty of the drive circuit 22 so that the calculated synchronization determination rate is in the target range. For example, the duty increase/decrease processing unit 74 increases/decreases the pulse width of the PWM drive duty based on the mode of the motor duty setting control processing unit 51 and a result of the determination of the determination unit 73.

Figure 4:
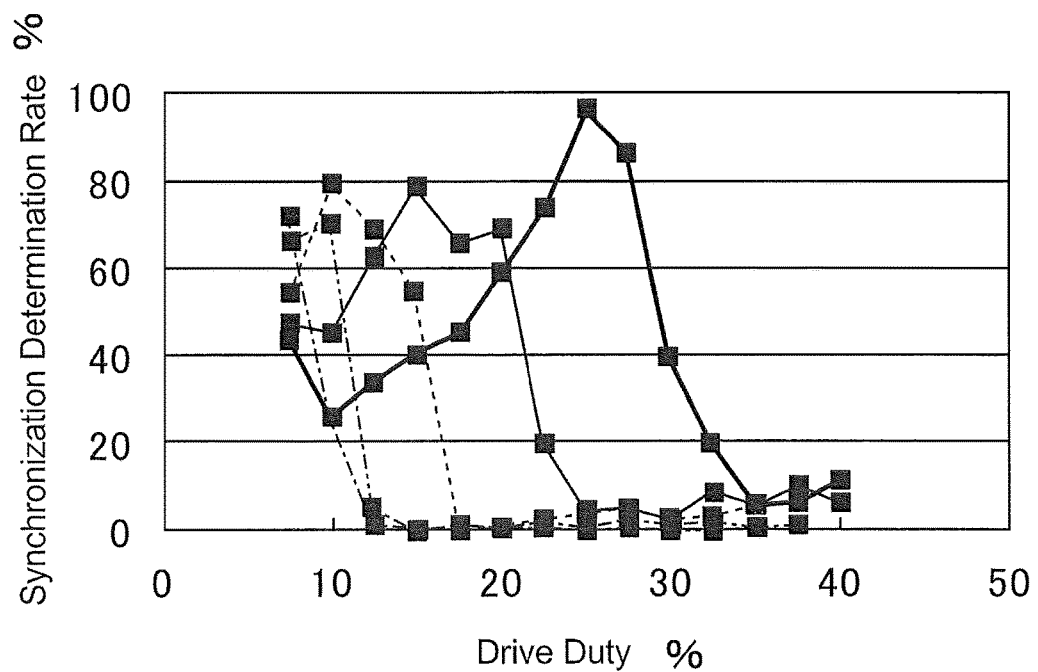
FIG. 4 is a figure illustrating an example of a relationship between a synchronization determination rate and a drive duty.

Here will be explained a relationship between the pulse width of the PWM drive duty (hereinafter also referred to as a drive duty) and the synchronization determination rate in a case where the oil temperature is low. FIG. 4 is a figure illustrating an example of a relationship between the synchronization determination rate and the drive duty (hereinafter referred to as a synchronization determination rate characteristic). In FIG. 4, the vertical axis denotes a synchronization determination rate, and the horizontal axis denotes a drive duty. In FIG. 4, a thick line, a solid line, a dotted line, an alternate long and short dashed line, and an alternate long and two short dashed line denote synchronization determination rate characteristics in a case where the oil temperature is a −35 degrees Celsius, −30 degrees Celsius, −25 degrees Celsius, −20 degrees Celsius, and −15 degrees Celsius, respectively.

At any of the oil temperatures, the synchronization determination rate characteristic is in an inverted V shape. More specifically, when the drive duty increases with respect to the predetermined maximum value of the synchronization determination rate, the value of the synchronization determination rate decreases. When the drive duty decreases, the value of the synchronization determination rate decreases. The vertex of the synchronization determination rate characteristic moves to a side where the drive duty is larger when the oil temperature decreases.

When the oil temperature increases, the motor 12 can be driven even if the drive duty is small, and therefore, the drive duty of the peak decreases (shifts to the left side in the drawing). When the oil temperature increases, and the viscosity of the oil decreases, the rotation varies, and this reduces the synchronization determination rate of the peak.

Figure 5:
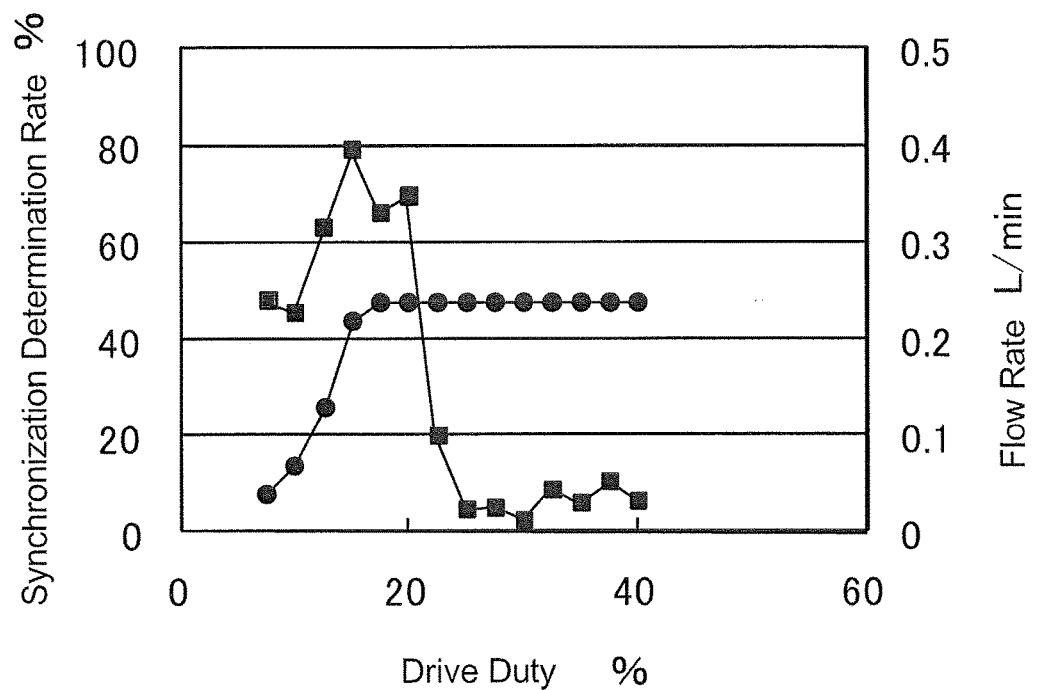
FIG. 5 is a figure illustrating an example of a relationship between a synchronization determination rate characteristic and a flow rate of an oil at an oil temperature of −30 degrees Celsius.

FIG. 5 is a figure illustrating an example of a relationship between the synchronization determination rate characteristic and the flow rate of the oil when the oil temperature is −30 degrees Celsius. In FIG. 5, a rectangular marker denotes the synchronization determination rate characteristic, and a circular marker denotes the flow rate of the oil. As shown in FIG. 5, as the drive duty increases, the flow rate of the oil increases, and the flow rate of the oil reaches the peak at about 0.24 L/min. When the relationship between the flow rate of the oil and the synchronization determination rate characteristic is considered, the flow rate of the oil is at the maximum and reaches the peak when the line is at an inclination at the right side of the synchronization determination rate characteristic in the inverted V shape, and more specifically, when the drive duty is about 20%. In the range of the inclination at the right side of the synchronization determination rate characteristic, the motor 12 generates a drive torque that is necessary and sufficient (neither too much nor too little) for pneumatic transporting the oil. More specifically, in this range, the drive torque of the motor 12 is neither insufficient nor too much. Therefore, this can reduce noise by suppressing vibration caused by the variation in the rotation, cause an electric current for rotating the motor 12 to be closer to the electric current that flows when synchronization is attained, and consume only an electric current required for maintaining the rotation. Even if the drive duty is further increased from this state, the flow rate of the oil does not increase, and useless electric current is consumed, and the noise is increased.

Figure 6:
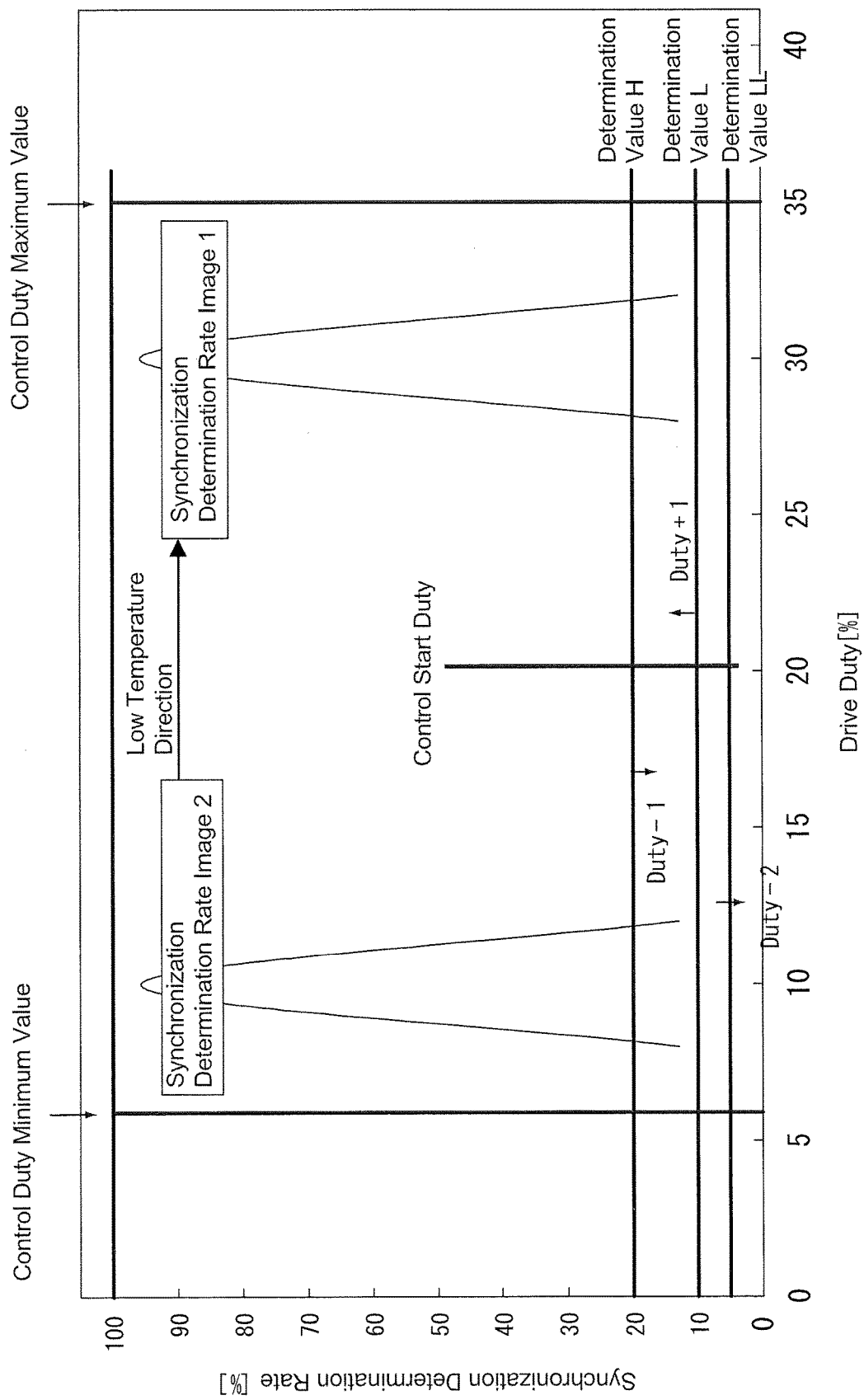
FIG. 6 is a figure illustrating a concept of control of a drive duty with respect to a synchronization determination rate.

Therefore, when the oil temperature is low, the electric oil pump controller 11 controls the drive duty so that the synchronization determination rate is maintained to have the inclination at the right side of the synchronization determination rate characteristic in the inverted V shape. FIG. 6 is a figure illustrating a concept of control of the drive duty with respect to the synchronization determination rate with the electric oil pump controller 11. In FIG. 6, an image 1 and an image 2 indicate a synchronization determination rate characteristic in the inverted V shape at a predetermined oil temperature, and when the oil temperature decreases more greatly, the synchronization determination rate characteristic moves from the image 2 in the direction of the image 1. In principle, when the synchronization determination rate is less than the determination value H, the electric oil pump controller 11 decreases the drive duty by one, and when the synchronization determination rate is more than the determination value L, the electric oil pump controller 11 increases the drive duty by one. By doing so, the pulse width of the PWM drive duty is controlled so that the synchronization determination rate is in the target range.

In order to move the pulse width into the control region in the shortest time as possible, in principle, the electric oil pump controller 11 decreases the drive duty by two in a case where the synchronization determination rate is less than the determination value LL.

In a case where the pulse width of the PWM drive duty is controlled based on a unit of one 256-th, increasing the drive duty by one means that the pulse width of the PWM drive duty is widened by 0.39% with respect to the maximum value of the pulse width of the PWM drive duty, and decreasing the drive duty by one means that the pulse width of the PWM drive duty is narrowed by 0.39% with respect to the maximum value of the pulse width of the PWM drive duty, and decreasing the drive duty by two means that the pulse width of the PWM drive duty is narrowed by 0.78% with respect to the maximum value of the pulse width of the PWM drive duty.

The control of the pulse width of the PWM drive duty is started from a control start duty of 20%. More specifically, the control of the pulse width of the PWM drive duty is started from the pulse width of the PWM drive duty which is the start width determined in advance.

Further, in a case where oil temperature information is provided from the host controller via the communication circuit, the control start duty is set in accordance with the oil temperature, and for example, in a case where the oil temperature is −30 degrees Celsius, the control of the pulse width of the PWM drive duty is started with the control start duty of 20%, and in a case where the oil temperature is −15 degrees Celsius, the control of the pulse width of the PWM drive duty is started with the control start duty of 10%. More specifically, the control of the pulse width of the PWM drive duty is started from the pulse width of the PWM drive duty which is the start width determined in accordance with the oil temperature.

FIG. 7 is a figure illustrating an example of a step value of control of the drive duty with respect to the synchronization determination rate with the electric oil pump controller 11. As described above, the mode setting processing unit 72 sets the mode of the motor duty setting control processing unit 51 to any one of previous duty positive mode, previous duty negative mode, and duty minimum/maximum changing mode in accordance with the state of control performed by the motor duty setting control processing unit 51.

In a case where the current mode of the motor duty setting control processing unit 51 is the previous duty negative mode, and the synchronization determination rate is less than the determination value H, the drive duty is decreased by one, and the subsequent mode of the motor duty setting control processing unit 51 is set to the previous duty negative mode. In a case where the current mode of the motor duty setting control processing unit 51 is the previous duty negative mode, and the synchronization determination rate is less than the determination value LL, the drive duty is decreased by two, and the subsequent mode of the motor duty setting control processing unit 51 is set to the previous duty negative mode. In a case where the current mode of the motor duty setting control processing unit 51 is the previous duty negative mode, and the synchronization determination rate is equal to or more than the determination value H, the drive duty is maintained, and the subsequent mode of the motor duty setting control processing unit 51 is set to the previous duty positive mode. In this case, maintaining the drive duty means that the value of the drive duty is maintained and is not changed.

In a case where the current mode of the motor duty setting control processing unit 51 is the previous duty positive mode, and the synchronization determination rate is more than the determination value L, the drive duty is increased by one, and the subsequent mode of the motor duty setting control processing unit 51 is set to the previous duty positive mode. In a case where the current mode of the motor duty setting control processing unit 51 is the previous duty positive mode, and the synchronization determination rate is equal to or less than the determination value L, the drive duty is maintained, and the subsequent mode of the motor duty setting control processing unit 51 is set to the previous duty negative mode.

FIG. 8 is a figure illustrating an example of parameters and values thereof of the electric oil pump controller 11. For example, the electric oil pump controller 11 uses a determination value H which is 20%, a determination value L which is 10%, a determination value LL which is 5%, a control start duty which is 20%, a control duty minimum value which is 5.9%, a control duty maximum value which is 35%, a synchronization determination rate sample number which is 90, and a synchronization determination rate pause number which is 10.

In this case, the step optimum value control processing explained below is executed at a time when sampling where up to 90 zero-cross signals, which is the predetermined number of sampling, can be obtained is finished, and thereafter, the sampling is paused for a sampling period in which up to 10 zero-cross signals can be obtained. More specifically, the zero-cross signals are obtained for a period according to the synchronization determination rate sample number, and the sampling is paused for a period according to the synchronization determination rate pause number, and this is repeated.

In a case where the drive duty attains a control duty minimum value of 5.9%, it is determined to have started from a position at the left side of the synchronization determination rate characteristic where the inclination is low, and the drive duty is set to a control duty maximum value of 35%.

Subsequently, the step optimum value control processing will be explained.

Figure 9:
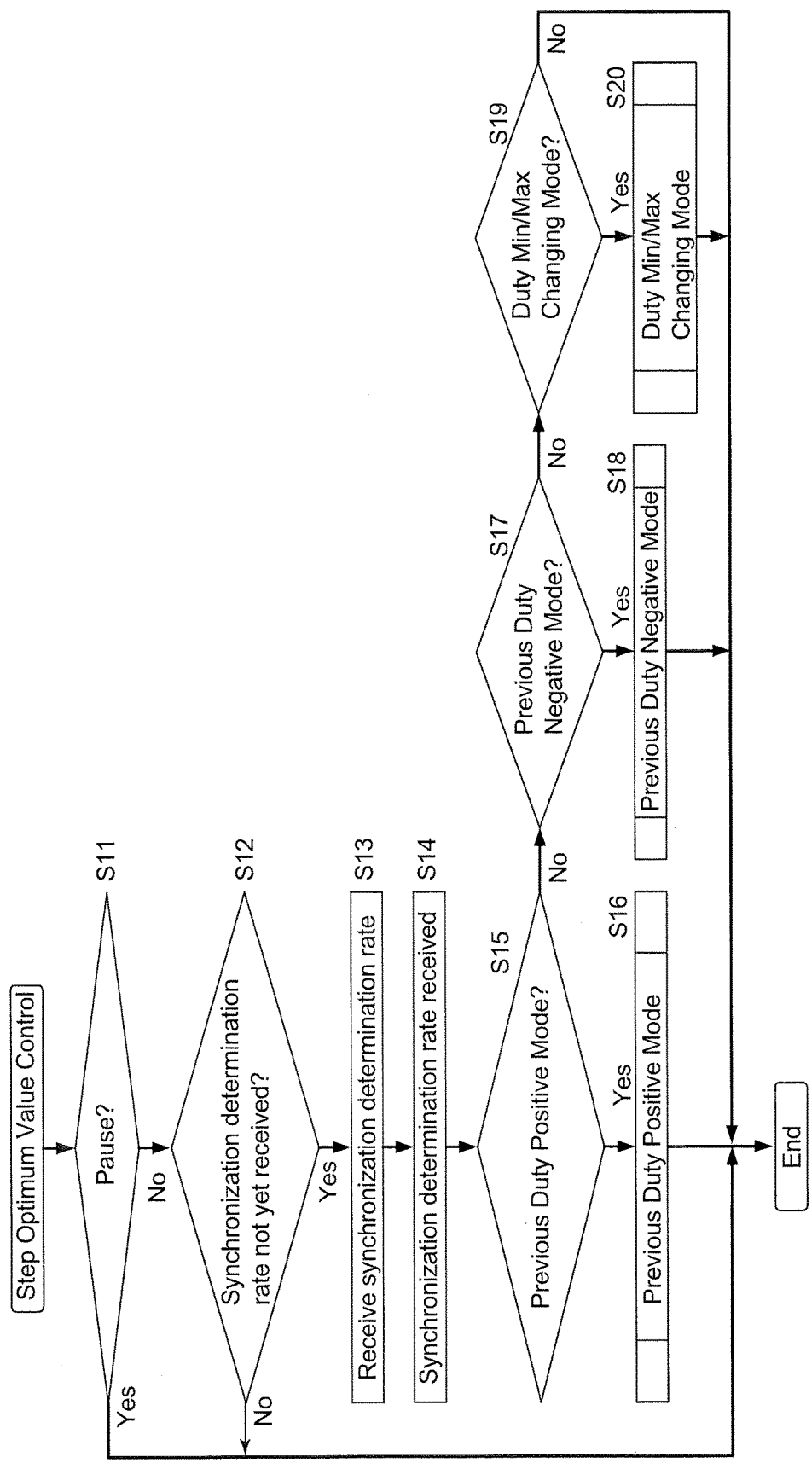
FIG. 9 is a flowchart for explaining processing of step optimum value control.

FIG. 9 is a flowchart for explaining a step optimum value control processing. In step S11, the mode setting processing unit 72 of the motor duty setting control processing unit 51 determines whether the mode is the pause mode or not. The control of the pulse width of the PWM drive duty is started from the control start duty of 20%. When the mode is determined not to be the pause mode in step S11, the mode setting processing unit 72 determines in step S12 whether the synchronization determination rate has not yet been received or not. When the synchronization determination rate is determined not to have been received yet in step S12, the mode setting processing unit 72 receives the synchronization determination rate from the synchronization determination rate calculation unit 71 in step S13.

In step S14, the mode setting processing unit 72 notifies the synchronization determination rate calculation unit 71 that the synchronization determination rate has been received.

In step S15, the mode setting processing unit 72 determines whether the current mode of the motor duty setting control processing unit 51 is the previous duty positive mode or not. When the current mode of the motor duty setting control processing unit 51 is determined to be the previous duty positive mode in step S15, the procedure proceeds to step S16, and the processing of the previous duty positive mode is executed.

After the processing of the previous duty positive mode, the motor duty setting control processing unit 51 gives a command of the pulse width of the PWM drive duty to the drive circuit 22, and the step optimum value control processing is terminated.

When the current mode of the motor duty setting control processing unit 51 is determined not to be the previous duty positive mode in step S15, the procedure proceeds to step S17, and the mode setting processing unit 72 determines whether the current mode of the motor duty setting control processing unit 51 is the previous duty negative mode. When the current mode of the motor duty setting control processing unit 51 is determined to be the previous duty negative mode in step S17, the procedure proceeds to step S18, and the processing of the previous duty negative mode is executed, and thereafter, the motor duty setting control processing unit 51 gives a command of the pulse width of the PWM drive duty to the drive circuit 22, and the step optimum value control processing is terminated.

When the current mode of the motor duty setting control processing unit 51 is determined not to be the previous duty negative mode in step S17, the procedure proceeds to step S19, and the mode setting processing unit 72 determines whether the current mode of the motor duty setting control processing unit 51 is the duty minimum/maximum changing mode or not. When the current mode of the motor duty setting control processing unit 51 is determined to be the duty minimum/maximum changing mode in step S19, the procedure proceeds to step S20, and the processing of the duty minimum/maximum changing mode is executed, and thereafter, the step optimum value control processing is terminated.

When the current mode of the motor duty setting control processing unit 51 is determined not to be the duty minimum/maximum changing mode in step S19, the step optimum value control processing is terminated. When the mode is determined to be the pause mode in step S11, the step optimum value control processing is terminated.

Figure 10:
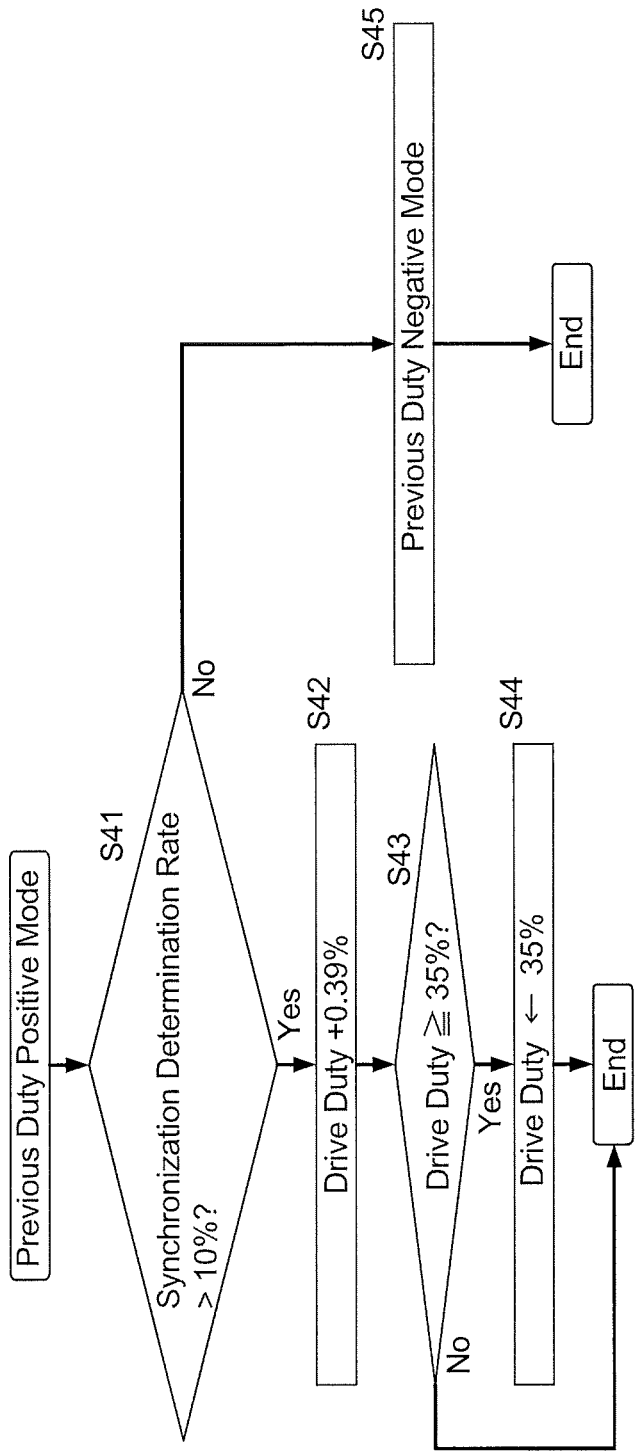
FIG. 10 is a flowchart for explaining processing of previous duty positive mode.

FIG. 10 is a flowchart for explaining processing of the previous duty positive mode. In step S41, the determination unit 73 compares a determination value L of 10% and the synchronization determination rate, and determines whether the synchronization determination rate is more than the determination value L or not. When the synchronization determination rate is determined to be more than the determination value L in step S41, the procedure proceeds to step S42, and the duty increase/decrease processing unit 74 increases the drive duty by one. More specifically, in this case, the duty increase/decrease processing unit 74 widens the pulse width of the PWM drive duty by 0.39% with respect to the current pulse width of the PWM drive duty.

In step S43, the determination unit 73 compares the drive duty and the control duty maximum value of 35%, and determines whether the drive duty is equal to or more than the control duty maximum value. When the drive duty is determined to be equal to or more than the control duty maximum value in step S43, the procedure proceeds to step S44, and the duty increase/decrease processing unit 74 sets the drive duty to the control duty maximum value, and the processing of the previous duty positive mode is terminated.

When the drive duty is determined not to be equal to or more than the control duty maximum value in step S43, the processing of the previous duty positive mode is terminated without further processing.

When the synchronization determination rate is determined not to be more than the determination value L in step S41, the procedure proceeds to step S45, and the mode setting processing unit 72 sets the mode of the motor duty setting control processing unit 51 to the previous duty negative mode, and the processing of the previous duty positive mode is terminated.

Figure 11:
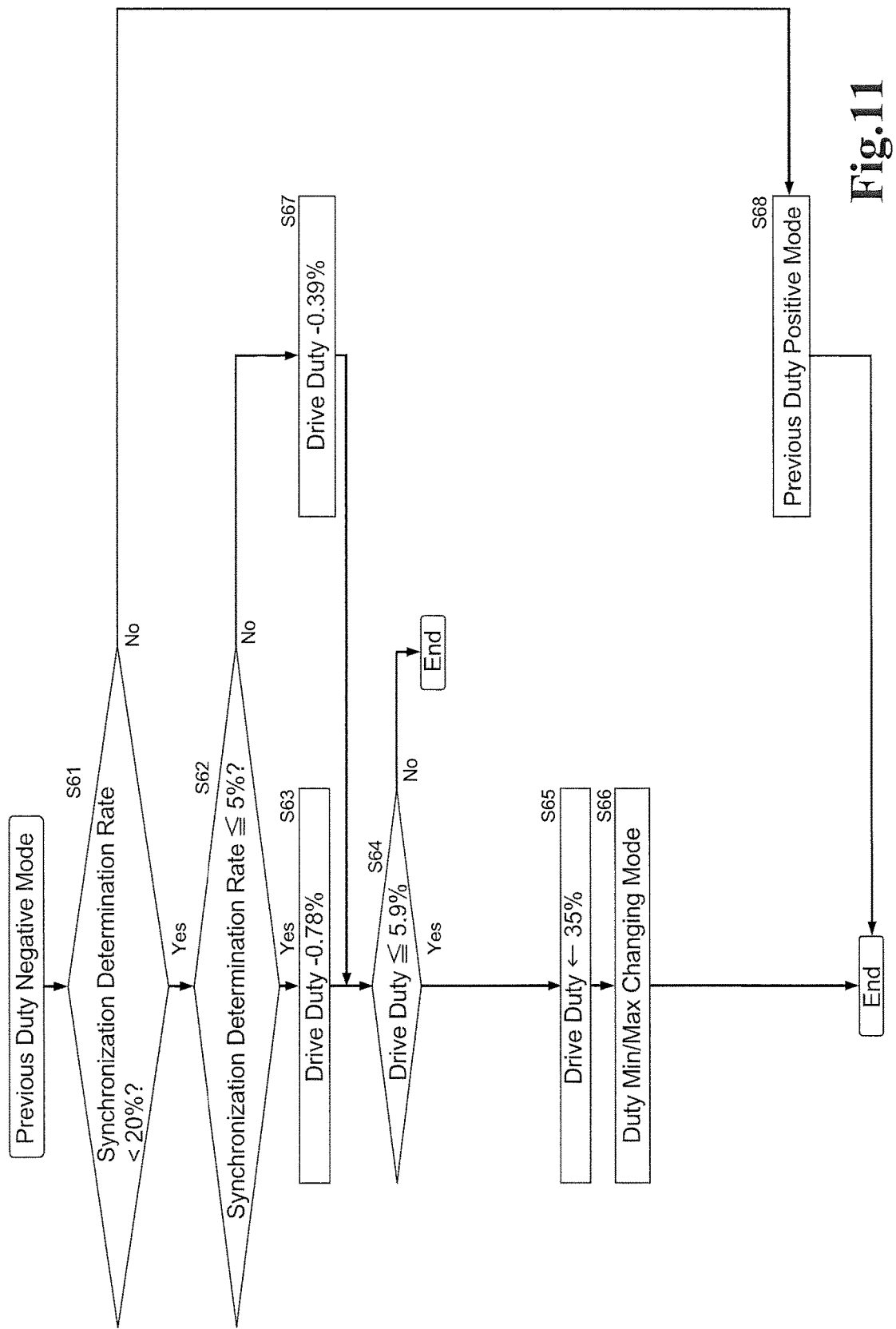
FIG. 11 is a flowchart for explaining processing of previous duty negative mode.

FIG. 11 is a flowchart for explaining processing of the previous duty negative mode. In step S61, the determination unit 73 compares a determination value H of 20% and the synchronization determination rate, and determines the synchronization determination rate is less than the determination value H or not. When the synchronization determination rate is determined to be less than the determination value H in step S61, the procedure proceeds to step S62, and the determination unit 73 compares a determination value LL of 5% and the synchronization determination rate, and determines whether the synchronization determination rate is equal to or less than the determination value LL or not.

When the synchronization determination rate is determined to be equal to or less than the determination value LL in step S62, the procedure proceeds to step S63, and the duty increase/decrease processing unit 74 decreases the drive duty by two. More specifically, in this case, the duty increase/decrease processing unit 74 narrows the pulse width of the PWM drive duty by 0.78% with respect to the current pulse width of the PWM drive duty.

In step S64, the determination unit 73 compares a control duty minimum value of 5.9% and the drive duty, and determines whether the drive duty is equal to or less than the control duty minimum value or not. When the drive duty is determined to be equal to or less than the control duty minimum value in step S64, the procedure proceeds to step S65.

In step S65, the duty increase/decrease processing unit 74 sets the drive duty to the control duty maximum value. In step S66, the mode setting processing unit 72 sets the mode of the motor duty setting control processing unit 51 to the duty minimum/maximum changing mode, and the processing of the previous duty negative mode is terminated.

When the synchronization determination rate is determined not to be equal to or less than the control duty minimum value in step S64, the processing of the previous duty negative mode is terminated.

When the synchronization determination rate is determined not to be equal to or less than the determination value LL in step S62, the procedure proceeds to step S67, and the duty increase/decrease processing unit 74 decreases the drive duty by one. More specifically, in this case, the duty increase/decrease processing unit 74 narrows the pulse width of the PWM drive duty by 0.39% with respect to the maximum value of the width of the pulse. Thereafter, the procedure proceeds to step S64.

When the synchronization determination rate is determined not to be less than the determination value H in step S61, the procedure proceeds to step S68, the mode setting processing unit 72 sets the mode of the motor duty setting control processing unit 51 to the previous duty positive mode, and the processing of the previous duty negative mode is terminated.

Figure 12:
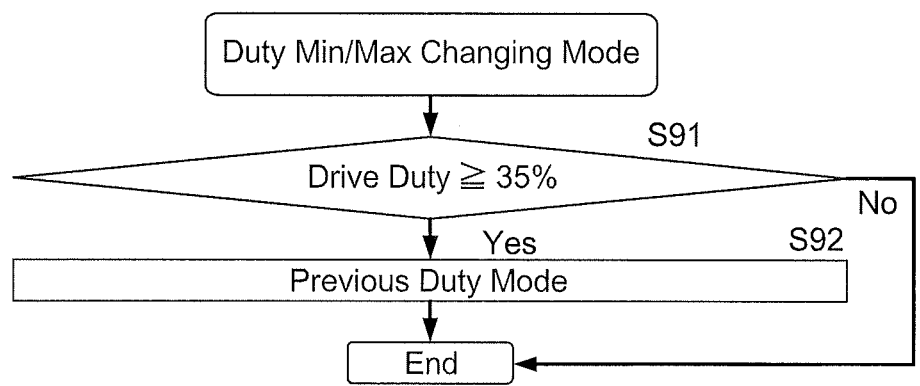
FIG. 12 is a flowchart for explaining processing of a mode in duty minimum/maximum change.

FIG. 12 is a flowchart for explaining processing of the duty minimum/maximum changing mode. In step S91, the determination unit 73 determines whether the drive duty is equal to or more than the control duty maximum value which is 35%. When the drive duty is determined to be equal to or more than the control duty maximum value which is 35% in step S91, the procedure proceeds to step S92, and the mode setting processing unit 72 sets the mode of the motor duty setting control processing unit 51 to the previous duty negative mode, the processing of the duty minimum/maximum changing mode is terminated.

When the drive duty is determined not to be equal to or more than the control duty maximum value which is 35% in step S91, the processing of the duty minimum/maximum changing mode is terminated without further processing.

As described above, the drive circuit 22 drives the motor 12 in accordance with the pattern for alternating the energizing phase for determining the rotation position of the rotor of the motor 12 which is the sensorless brushless DC motor, the detection circuit 23 detects the zero-cross signal indicating the alternation of the phase of the rotor, the synchronization determination rate calculation unit 71 calculates the synchronization determination rate indicating the ratio of the number of detected zero-cross signals, the duty increase/decrease processing unit 74 controls the pulse width of the PWM drive duty of the drive circuit 22 so that the calculated synchronization determination rate is in the target range, and therefore, the drive torque of the motor 12 is neither too much nor too little, so that this can reduce noise by suppressing vibration caused by the variation in the rotation, cause an electric current for rotating the motor 12 to be closer to the electric current that flows when synchronization is attained, and consume only an electric current required for maintaining the rotation.

More specifically, for example, in a case where the oil temperature is −30 degrees Celsius (FIG. 4, FIG. 5), the control of the pulse width of the PWM drive duty is started from the start duty of 20%, and therefore, until the synchronization determination rate becomes equal to or less than 10% (step S41 of FIG. 10), the previous duty positive mode is maintained (the processing in step S11 to step S16 is repeated), and the drive duty increases. When the synchronization determination rate decreases in accordance with the increase of the drive duty, and the synchronization determination rate becomes equal to or less than 10% (when the drive duty becomes about 24%), the mode becomes the previous duty negative mode. Then, until the synchronization determination rate becomes equal to or more than 20% (step S61 of FIG. 11), the previous duty negative mode is maintained (the processing in step S11 to step S14, step S17, and S18 is repeated), and the drive duty decreases. When the synchronization determination rate increases in accordance with the decrease of the drive duty, and the synchronization determination rate becomes equal to or more than 20% (when the drive duty becomes about 22%), the mode becomes the previous duty positive mode. This processing is repeated. More specifically, the control can be performed while the drive torque of the motor 12 becomes neither too much nor too little, and the state in which the flow rate of the oil is the maximum (the position on the inclination at the right side of the synchronization determination rate characteristic) can be maintained (FIG. 5).

When the oil temperature increases in accordance with this processing, and for example, when the oil temperature becomes −25 degrees Celsius (FIG. 4), the derive duty further decreases in the previous duty negative mode, and the drive duty is controlled between about 17 to 18%. More specifically, the control can be performed while the drive torque of the motor 12 becomes neither too much nor too little at −25 degrees, and the state in which the flow rate of the oil is the maximum can be maintained.

In the above explanation, for example, the case where the drive duty is controlled has been explained, but the magnitude of the electric current passed to the motor can be controlled.

It should be noted that the program executed by the computer may be a program with which processing is performed in time sequence according to the order explained in this specification, or may be a program with which processing is performed in parallel or with necessary timing, e.g., upon call.

The embodiment of the present invention is not limited to the above embodiments. The embodiments of the present invention can be changed in various manners without deviating from the gist of the present invention.

The invention claimed is:

1. A drive device for a sensorless brushless DC motor comprising:

a drive circuit that drives the sensorless brushless DC motor by alternating, with a constant cycle, an energizing pattern for determining a rotation position of a rotor of the sensorless brushless DC motor;

a detection circuit that detects a zero-cross signal indicating alternation of a phase of the rotor; and a processor that calculates a synchronization determination rate as a percentage by dividing the number of zero-cross signals detected by the detection circuit in a predetermined sampling period by the maximum number to be potentially obtained in that sampling period and controls a PWM (Pulse Width Modulation) drive duty to be supplied to the drive circuit for controlling a driving current supplied from the drive circuit to the sensorless brushless DC motor so that the calculated synchronization determination rate is in a target range.

2. The drive device according to claim 1, wherein the processor is configured to narrow the pulse width of the PWM drive duty, widen the pulse width of the PWM drive duty, or maintain the pulse width of the PWM drive duty, in accordance with a result of a comparison of a first threshold value and the synchronization determination rate, or a comparison of a second threshold value less than the first threshold value and the synchronization determination rate.

3. The drive device according to claim 2, wherein the processor is configured to, in a case where the synchronization determination rate is less than the first threshold value or equal to or less than the second threshold value in a previous control of the pulse width of the PWM drive duty, narrow the pulse width of the PWM drive duty when the synchronization determination rate is less than the first threshold value in a current control of the pulse width of the PWM drive duty, and maintain the pulse width of the PWM drive duty when the synchronization determination rate is equal to or more than the first threshold value in the current control of the pulse width of the PWM drive duty, and in a case where the synchronization determination rate is equal to or more than the first threshold value or more than the second threshold value in a previous control of the pulse width of the PWM drive duty, widen the pulse width of the PWM drive duty when the synchronization determination rate is more than the second threshold value in the current control of the pulse width of the PWM drive duty, and maintain the pulse width of the PWM drive duty when the synchronization determination rate is equal to or less than the second threshold value in the current control of the pulse width of the PWM drive duty.

4. The drive device according to claim 1, wherein the processor is configured to start the control of the pulse width of the PWM drive duty from the pulse width of the PWM drive duty which is a start width determined in advance.

5. The drive device according to claim 1, wherein the processor is configured to start the control of the pulse width of the PWM drive duty from the pulse width of the PWM drive duty which is a start width determined in accordance with an oil temperature.

6. A control method of a sensorless brushless DC motor driven by alternating, with a constant cycle, an energizing pattern for determining a rotation position of a rotor of the sensorless brushless DC motor, including:

a detection step of detecting a zero-cross signal indicating alternation of a phase of the rotor of the sensorless brushless DC motor;

a calculation step of calculating a synchronization determination rate as a percentage by dividing the number of zero-cross signals detected in the detection step in a predetermined sampling period by the maximum number to be potentially obtained in that sampling period; and a PWM drive duty pulse width control step of controlling a pulse width of a PWM drive duty so that the calculated synchronization determination rate is in a target range.

* * * * *